United States Patent
Kretz et al.

(10) Patent No.: US 6,460,179 B1
(45) Date of Patent: *Oct. 1, 2002

(54) TRANSMISSION OF MENUS TO A RECEIVER

(75) Inventors: Christoph Kretz; Hugh Cautley, both of Vienna (AT)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,518

(22) Filed: Jul. 2, 1996

(30) Foreign Application Priority Data

Jul. 3, 1995 (EP) ............................................. 95201807
Aug. 25, 1995 (EP) ............................................. 95202305

(51) Int. Cl.⁷ ................................................. H04N 7/16
(52) U.S. Cl. ............................ 725/37; 348/473; 725/40
(58) Field of Search ................................. 348/906, 553, 348/563, 564, 560, 570, 146, 473; 345/327, 328, 352, 353, 354, 329, 330, 331, 333, 146; 725/38–61

(56) References Cited

U.S. PATENT DOCUMENTS

| 4,992,871 | A |   | 2/1991  | Bensch et al. ............... 358/142 |
| 5,585,838 | A | * | 12/1996 | Lawler et al. ................. 348/13 |
| 5,596,373 | A | * | 1/1997  | White et al. ................. 348/569 |
| 5,619,249 | A | * | 4/1997  | Billock et al. .................. 348/7 |
| 5,686,954 | A | * | 11/1997 | Yoshinobu et al. ............ 348/13 |
| 5,731,844 | A | * | 3/1998  | Rauch et al. ................ 348/563 |
| 5,781,246 | A | * | 7/1998  | Alten et al. ................. 348/569 |
| 5,798,785 | A | * | 8/1998  | Hendricks et al. ............. 348/12 |
| 5,805,235 | A | * | 9/1998  | Bedard ........................ 348/906 |
| 5,880,768 | A | * | 3/1999  | Lemmons et al. ............. 725/41 |
| 6,005,561 | A | * | 12/1999 | Hawkins et al. ............. 345/327 |

FOREIGN PATENT DOCUMENTS

| EP | 0617556 A1 | 3/1993 |
| WO | 9413102    | 6/1994 |

* cited by examiner

*Primary Examiner*—Chris Grant
*Assistant Examiner*—Reuben M. Brown
(74) *Attorney, Agent, or Firm*—Laurie E. Gathman (57) ABSTRACT

Method and arrangements for transmitting and receiving menus, e.g. for accessing an electronic television programme guide. Each menu comprises a plurality of menu items which can be selected by a user. With each menu item, a subpicture can be associated. A subpicture is displayed when the cursor touches an associated menu item on screen. Thus, by moving the cursor over the screen, the subpicture dynamically changes so as to display a brief explanation of the menu items.

6 Claims, 4 Drawing Sheets

TRANSMISSION OF MENUS TO A RECEIVER

BACKGROUND OF THE INVENTION

The invention relates to a method of transmitting a menu to a receiver for display on said receiver, comprising the step of transmitting menu structure data defining displayable menu items which are selectable by a cursor. The invention also relates to a transmitter, television receiver and a display device for transmitting, receiving, and displaying, respectively, said menu.

A known method and arrangement for transmitting menus to a television receiver as defined hereabove is disclosed in U.S. Pat. No. 4,992,871. The prior art method relates to teletext broadcast systems. The menus are transmitted as additional teletext pages, each comprising the menu items and the page numbers of the relevant teletext pages associated therewith. The user retrieves a particular page of interest by placing the cursor on the page number associated with a desired menu item and presses an OK key. If a plurality of menu pages is transmitted to form a tree structure, this step is repeated as many times as necessary.

The transmission of electronic television video guides, whether or not in the form of teletext pages, is a feature of growing commercial importance. Some TV stations (e.g. Pro7 in Germany) transmit TV guide information related to a plurality of TV stations via teletext. Each teletext page comprises the programs scheduled for a day or a part thereof. Some TV stations also transmit a teletext page showing all programs currently being broadcast by a plurality of TV stations. Needless to say that a video guide transmission system must offer appropriate menus to assist the user in finding the desired information. An easy-to-use and attractive menu based access system is proposed in Applicant's co-pending patent application PHN 15.374 EPP, filed simultaneously with this application.

SUMMARY OF THE INVENTION

It is an object of the invention to provide a method and arrangement for transmitting menus, wherein the menus have an attractive appearance and which yet better assist the user in retrieving the information of interest.

According to the invention, the method is characterized in that the method comprises the step of transmitting subpicture data defining displayable subpictures, and the step of associating with each menu item attribute data for linking a selected subpicture to said item so as to simultaneously display the menu and the subpicture which is associated with the menu item the display position of which corresponds with the display position of the cursor. Herewith is achieved that, while the cursor is moved over the various menu items on screen, a subpicture with information related to each menu item pops up dynamically. An important application hereof is to provide the user in advance, for each selectable menu item, a brief explanation of actions which will be carried out when said item will indeed be selected. It is also possible to dynamically show commercials, each commercial being specially related to a menu item.

According to a further aspect of the invention, a display device for displaying a menu comprises memory means for storing menu structure data defining displayable and user-selectable menu items, display means for displaying said menu, and cursor means for displaying a cursor in said menu. The device is characterized in that it comprises further memory means for storing subpicture data defining displayable subpictures, with each menu item attribute data being associated for linking a selected subpicture to said item, the display means further being adapted to simultaneously display the menu and the stored subpicture which is associated with the menu item of which the display position corresponds with the display position of the cursor. In such a display device, the various kinds of data are stored in advance.

DETAILED DESCRIPTION OF THE PREFERRED EMBODIMENTS

Figure 1:
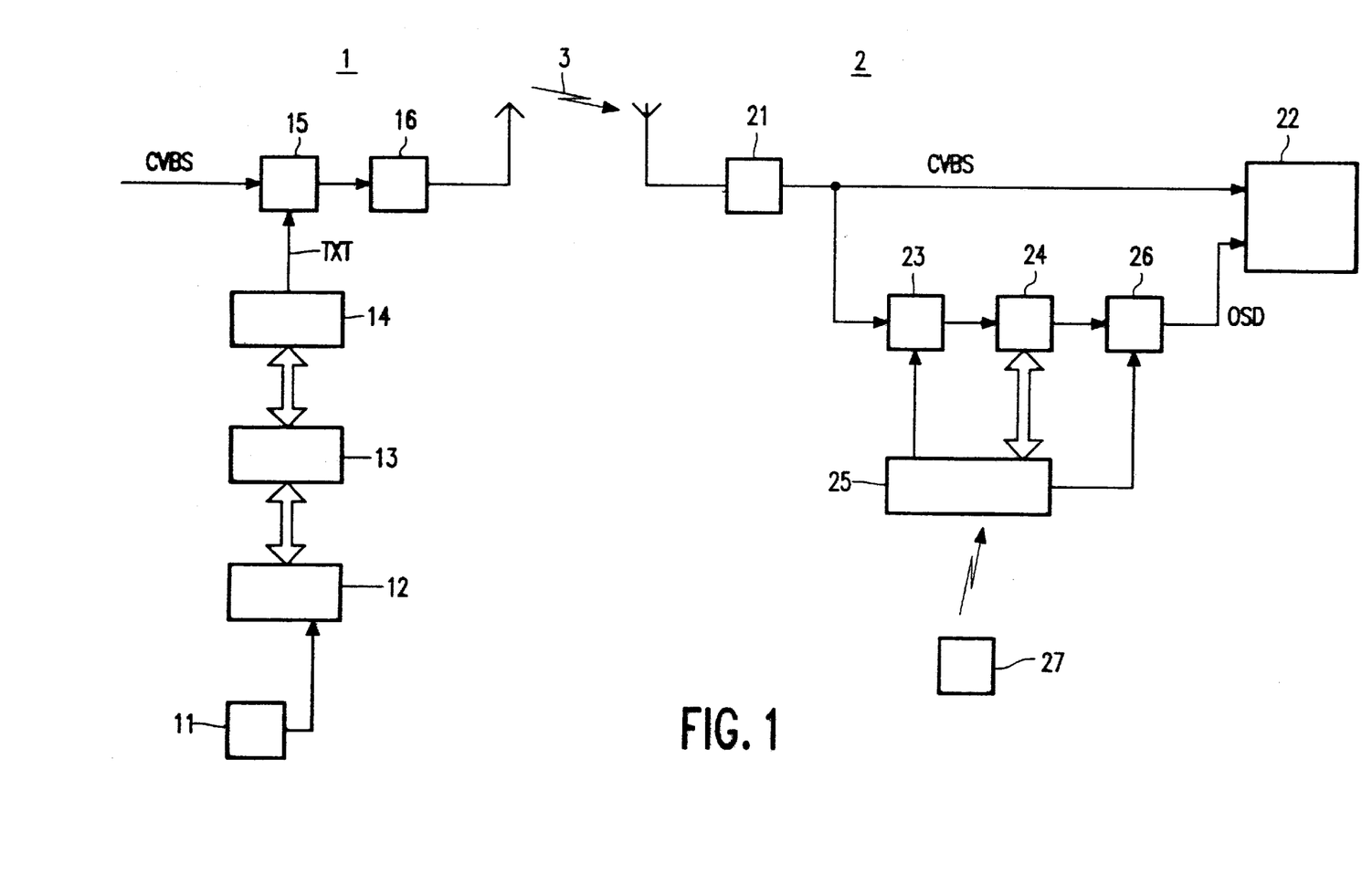
FIG. 1 shows a system comprising a transmitter and a receiver according to the invention.

FIG. 1 shows a system comprising transmitter 1 and a receiver 2 according to the invention. The transmitter comprises an editing terminal 11 for creating and updating a database of information, a processor 12, a memory 13 for storing the database, and a page composer 14 for packing the stored database into teletext pages TXT. The transmitter further comprises a teletext inserter 15 for inserting the teletext pages in the flyback period of a composite video signal CVBS. The thus obtained television signal is applied to a modulator 16 for broadcast over a transmission medium 3.

The receiver comprises a tuner 21 for receiving the television signal. The received signal is directly applied to a television monitor 22 so as to display the television programme. The signal is also applied to a teletext data decoder 23 which is adapted to acquire selected teletext pages and to store them in a memory 24. A microprocessor 25 is connected to decoder 23 so as to apply the relevant page numbers, and is further connected to the memory 24 so as to process the information stored therein. The receiver further comprises a graphic generator 26 adapted to read a predetermined display segment of memory 24 and to generate an On-Screen-Display picture OSD defined by data stored in said memory segment. The OSD picture includes a cursor, the position of which is applied by the microprocessor in response to positioning signals from a remote cursor control device 27.

In practice, the receiver described above may take the form of a videorecorder. The videorecorder may have an embedded display device 22 or an output for applying the display signals CVBS and OSD to a separate display device 22 such as a television set.

Operation of the Transmitter

The operation of the transmitter will now be described with reference to the transmission of an electronic TV programme guide. The invention, however, is not restricted to this application. The programme guide items as well as data for accessing and presenting the programme guide at the receiver end are created by editorial staff using editing terminal 11. The information is processed by processor 12 and stored in various segments of memory 13. Each memory segment defines an amount of data which will further be referred to as a section of the database. The page composer 14 packs each section in one or more teletext pages. As the teletext pages are not intended for direct display, they have hexadecimal page numbers. Data which is most sensitive to transmission errors, such as headers, dates and times, string lengths, teletext page numbers, etc., are protected by a Hamming code. The first teletext page has a predetermined page number (e.g. 3A0) and contains a table of content. This is a list of teletext page numbers carrying the data stream. If the table of content does not fit in one teletext page, a reference to subsequent teletext pages is made.

Figure 2:
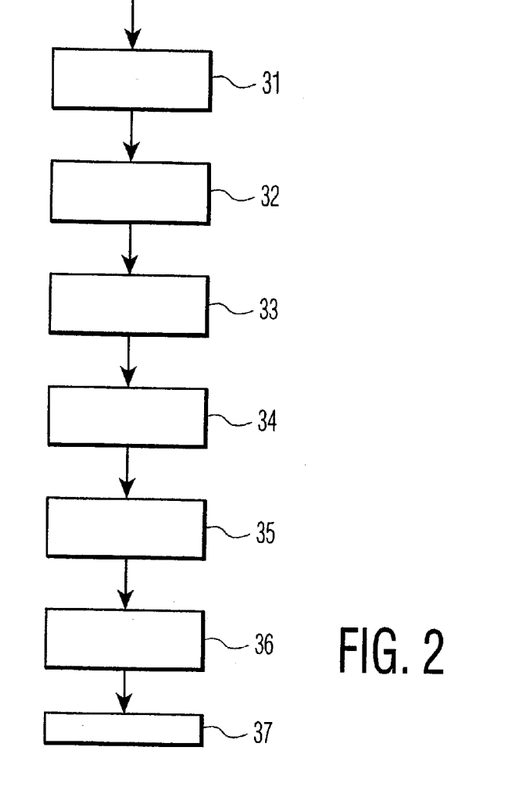
FIG. 2 shows a flowdiagram of steps of transmitting sections of the database by the transmitter of FIG. 1.

FIG. 2 shows a flowdiagram of transmission steps executed by the transmitter. Each step includes the transmission of a section of the database, i.e. the transmission of a respective segment stored in memory 13. Each section relates to a certain functionality and comprises data items such as parameters, values, text strings, attributes, etc. In a step 31 a Basic Info section is transmitted, comprising basic data such as date and time and some other general data so as to ease the management of memory in a television receiver. In a step 32 a Layout Info section is transmitted, defining a variety of design tools for composing the electronic programme guide. In a step 33 a Graphics section is transmitted in which a plurality of graphic subpictures is defined for display on screen. In a step 34 a Table Info section is transmitted, defining a collection of properties which may be associated with information items. In a step 35 a Menu Info section is transmitted, conveying the menu structure data for accessing the program guide. In a step 36 a Programme Info section is transmitted for building up the TV programme guide database. The transmission of the database ends with the transmission, in a step 37, of an End-of-Protocol code. The database is transmitted regularly, e.g. a few times per day.

The sections will now be described in more details. As not all section are equally essential to the invention, some sections will only briefly be discussed. In the following description, sections are shown in double framed boxes. A collection of data items in a section may constitute a block. Blocks are shown in single framed boxes. A++ symbol is placed next to a data item or block if it is repeatedly transmitted. For example, a section:

comprises three data items of which the block comprising item_2 and item_3 may be repeated. Each section starts with a header. This is a code identifying the section and indicating its beginning. The type of the data items (such as byte, character, string) is not given here because it is not essential to the invention.

The Section Basic Info

This section comprises basic data such as date and time and some other general data so as to ease the management of memory in a television receiver. The Basic Info section has the following format:

Herein, date and time represent the date and time of issue of the database. No_programmes is the number of programmes contained in the Programme Info section. No_menuitems is the number of menu items in the Menu Info section. No_criteria is the number of criteria in the Table Info section. No_graphics is the total number of graphics, including the logos defined in the Table Info section. Poolsize is the total size of all the titles, programme infos and descriptions and criteria names.

The Section Layout Info

This section gives a variety of design tools to the supplier of the electronic programme guide. The format of this section is:

No_of_colours and colour++ define the length and contents, respectively, of a colour look up table. By default, a standard teletext colour table is used. The rest of the section specifies the appearance of the various menus on screen. Screensize gives the full screen size in pixels, in horizontal and vertical direction. Because the menus are organized in a tree structure, each menu is assigned a level of which there are no_of_levels available. As will be described later, two menus of different levels may be displayed simultaneously. This is referred to as an "arrangement". The number of arrangements is specified by no_of_arrgmnts. The item layout_data is a block of data defining features such as height, font, colours, position, spacing, etc., of headlines and menu items of the menu.

The Section Graphics

Figure 3:
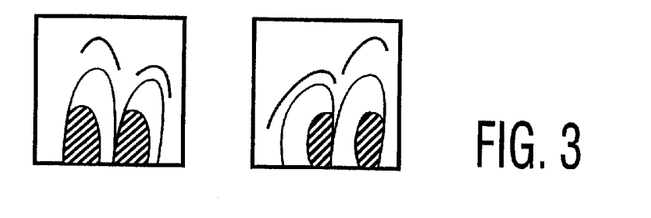
FIGS. 3 and 4 show examples of different motion phases of subpictures for display by the receiver shown in FIG. 1.
Figure 4:
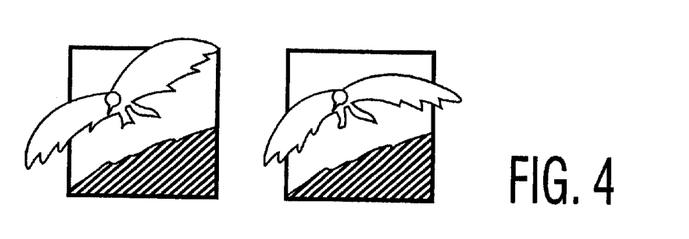

In this section, one or more graphic subpictures (hereinafter also referred to as "graphics" for short) are defined which can be displayed on screen. The general format of this section is:

Herein, no_grphcs gives the number of graphics defined in the section. Grphc_no is an index number for invoking the subpictures. The data item graphic itself is a block of data defining a rectangular subpicture. Four types of graphics are being distinguished in this protocol: bitmaps, symbols, dynacons, and text strings. A bitmap is the general term for a graphic. It is a rectangular matrix of pixels forming a subpicture. Symbols and dynacons are bitmaps as well, but with special conventions. Symbols are intended for use within text strings. A text including a symbol comprises an escape character followed by graphic_no to invoke the symbol. Dynacons ("dynamic icons") consist of a predefined sequence of 2 or more bitmaps. Each bitmap represents one motion phase of the dynacon. By cyclically displaying said motion phases, the viewer sees one bitmap after the other, which becomes manifest as a simple animation of the subpicture. The period of time during which each phase is to be displayed can be fixed in the receiver, or may be transmitted as a data item in the section. A dynacon with one single phase is a symbol. The phases "overload" the colour table, per phase there is one complete colour table as common from a bitmap. Dynacons can be used like symbols. FIGS. 3 and 4 show examples of dynacons. The two motion phases shown in FIG.3 give an impression of blinking eyes, for example, to draw the user's attention to a special item on screen. The two motion phases shown in FIG. 4 give an impression of flapping wings, for example, to be associated with a television programme on birds.

Bitmaps, symbols and dynacons may be encoded either pixel-by-pixel or by using a run-length code. Both the type of graphics and the method of encoding are defined by the section header which has a plurality of possible values for this purpose.

For pixel-by-pixel encoded bitmaps, symbols and dynacons, the format of the block graphic is:

```
bits_per_colour
colour_table
x-tlcorner
y-tlcorner
x_xtns
y_xtns
pixel_block
```

Herein, bits_per_colour defines the number of colours which can be used, and colour_table is an array of three values defining each colour in terms of red, green and blue levels. The parameters x_tlcorner and y_tlcorner define the position of the bitmap on screen in terms of a character location. The parameters x_xtns and y_xtns define the size of the bitmap on the screen in pixels. Pixel_block defines the colour of each pixel in terms of an index to the colour look up table in a predetermined scanning order. Every colour index consists of bits_per_colour bits.

For run-length-encoded bitmaps, symbols and dynacons, the format of the block graphic is:

```
bits_per_colour
colour_table
x-tlcorner
y-tlcorner
x_xtns
y_xtns
pblsize
pixel_block
```

The same definitions as above apply. The parameter pblsize defines the size of pixel_block which now accommodates a plurality of run-length codes. Methods for run-length coding graphic images are generally known.

The Section Table Info

The Table Info section defines a collection of properties (hereafter referred to as criteria), which may be associated with information items. The criteria are to be defined by the information provider, but they have to be matched one of the meta criteria types laid down here. Every section creates one table of criteria.

```
TABLE_HEADER
type
no_of_items
  item_no
  item              ++
```

Every type defines a list of criteria as defined in the table below. A programme may have a specific criterion. If so, it appears in a list of programmes fulfilling said criterion. No_of_items gives the length of the list. Item_no and item always appear together. A criterion referenced by item_no is called as stated by item. In case of ratings, which do not have items, the item string is an empty one. In case of broadcaster logos, the items are constructed as defined in the Graphics section.

| type | meta criterion |
|---|---|
| 0 | broadcaster |
| 1 | broadcaster logos |
| 2 | language |
| 3 | keyword |
| 4 | category |
| 5 | rating |
| 10 + i | sub category [i] |

The Section Menu Info

The section Menu Info conveys the menus to access the program guide and can also be used to transport non-programme information, e.g. news or help. It defines a hierarchically structured tree of charts, each chart consisting of a headline and several items. Each item may expand to a new, more detailed sub chart. An example of the menu structure will be given later. The transmission format of the section Menu Info is shown in the following Table:

```
MENU_HEADER
no_of_items
  item_no
  level
  menu_item
  no_of_attributes
    attribute ++        ++
```

Item_no is an item number assigned to a menu_item in the range from 0 up to and inclusive no_of_items-1. Level is an unsigned number, telling how deep in the tree the menu comprising this item lays. Menu_item is a string of characters representing an information item. The first menu_ item at a given level of a menu is the headline of said menu.

Basically, the text string defined by menu_item is to be displayed as such as a menu item on screen. However, if its first character is a special character, menu_item represents a reference to a string stored elsewhere in a television receiver. In the current example of a television program guide, menu_item may refer to a piece of text in a particular teletext page, or to a programme transmitted in the Programme Info section still to be described.

A reference to teletext is indicated by the special first character "@" and further comprises successively: the number of the relevant TV station in a broadcaster table; the teletext page number (which may include a subcode); row and column number of the position in the teletext page where the text to be displayed starts; and row and column number of the position in the teletext page where the text ends.

A reference to a programme string transmitted in the Programme Info section is indicated by the special first character "^" and further comprises the number of the program in that section.

If menu_item is a criterion (e.g. a category), it will expand to a list of (pre-)sorted programme information. If menu_item represents the Fast Finder or any other self-expanding item, a title is placed in the headline (the first menu_item of the menu) and a corresponding attribute added.

Each menu_item in the section may have zero, one or more attributes assigned to it, the number of attributes being given by no_of_attributes. An attribute is a block of data comprising a header defining the attribute as well as the kind and format of the subsequent data. Some attributes enhance or extend the menu item, others define a criterion to be applied to the stored information items so as to obtain a list of information items fulfilling said criterion. Some examples of attributes will now be described.

Attributes INS_DATE and INS_TIME specify that the current date and/or time are to be inserted in the menu item. A specification of the display format (e.g. "14:22" or "2.22 a.m.") may be included.

An attribute GRPHCS specifies the graph_no of a graphic subpicture to be displayed. If the attribute is connected to a menu headline (the first menu_item at a given level), the subpicture is to be displayed during the time that the relevant menu is displayed. If the attribute is connected to selectable menu items, the subpicture pops up when the cursor touches that item on screen.

An attribute SORT_DATE specifies an offset (0=today, 1=tomorrow, etc.) with respect to the date of issue of the programme guide as defined in the section Basic Info. The attribute constitutes an instruction for the television receiver to search and display all programmes fulfilling the criterion.

An attribute SORT_TIME specifies a time interval and instructs the receiver to search and display all programmes scheduled for broadcast within said interval. A special code designates the current time to be the start of the interval.

An attribute CRITERION searches the programmes fulfilling a criterion other than date and time. The attribute defines the type, number and index of the corresponding criteria table (the values are defined in the section Table Info). The attribute may be added to programme or menu items. If attached to a programme item, it defines a criterion of that programme. If it is attached to a menu item, it forces a menu to be made up of programmes which have that criterion attached to.

An attribute METACRITERION defines only the type of the corresponding criteria table. This attribute may be added to menu items only, thus defining a menu composed of all items of that table type. If type is criterion, then any item of the constructed menu expands to the corresponding table of subcategories. If it is not a criterion, then any item expands to a selection of programmes.

An attribute LINKEDITEM establishes a link between a menu item and other displayable information so as to display both simultaneously. Some possible links (e.g. to graphic subpictures) have already been mentioned. The attribute can be added to menu items as well as programmes (see section Programme Info). The display area where to put the linked element on screen is specified. The linked item is displayed whenever the item with the attribute is the only one on the screen or whenever the cursor touches it. Links can be established to an element of a different section or to a (piece of a) teletext page. A link can also by itself define a text string to be displayed. This is defined by a code immediately following the attribute header. The code is followed by further data. A possible data format is shown below.

|  | code | further data |
|---|---|---|
| link including string | 0 | string |
| link to a teletext service | 1 | station_no, page_number, subcode, row_spec, col_spec |
| link to section Graphics | 2 | graphic_no |
| link to section Table Info | 3 | type, item_no |
| link to section Menu Info | 4 | item_no |
| link to section Programme Info | 5 | programme_no |

An attribute MULTILEVEL instructs the receiver to display two levels of a menu simultaneously on one screen. The attribute is added to the headline of a menu at a given level, and specifies whether the next higher level or the next lower level is to be displayed.

The Section Programme Info

Whereas the section Menu Info is to construct a menu tree to navigate through the database, the section Programme Info is to build up the programme database. The section conveys all programmes, which become available within the program guide, and contains all the necessary information needed for pre-sorting. The programme related functions (as expanding to programme description, viewing, timer programming etc.) do not imply an explicit option. The format of the section is:

Herein, programme_no is a program number. If there is one programme info section, this number goes from 0 to no_programmes-1 inclusive (no_programmes is defined in the section Basic info). Date_offset is the offset from the day of issue of the programme guide to the day of transmission of the programme, e.g. 0=today, 1=tomorrow, etc. Station_no is an index of the station in the broadcaster table defined in the section Table Info. The parameters start_time, stop_time and vps_time speak for themselves. In order to extend a day's scope to the early morning, hours may go up to 30 (=24+6).

The items title, prog_info and prog_descr are strings. They may also identify a reference to different programme items, using the mechanism explained hereinbefore with respect to menu items. If title identifies a reference, a programme is repeated at a different time or on a different station unless prog_info or prog_descr are not empty. If any of the items is a string and one or two of them are references, only the string with reference has to be copied from the referenced programme. For instance, if a programme is repeated but the identical programmes are to be displayed with different advertisements in prog_info, both title and prog_descr must take the form of the reference. If title is a reference to a teletext string including start- stop- and VPS-times according to the VPT-standard, a special code is used. Another special code is used if there is no VPS available.

The parameter no_prog_options specifies the number of subsequent prog_options. Program options in the section Programme Info have the same function, and are likewise encoded, as attributes in the section Menu Info.

Example of a Menu Structure

Figure 5:
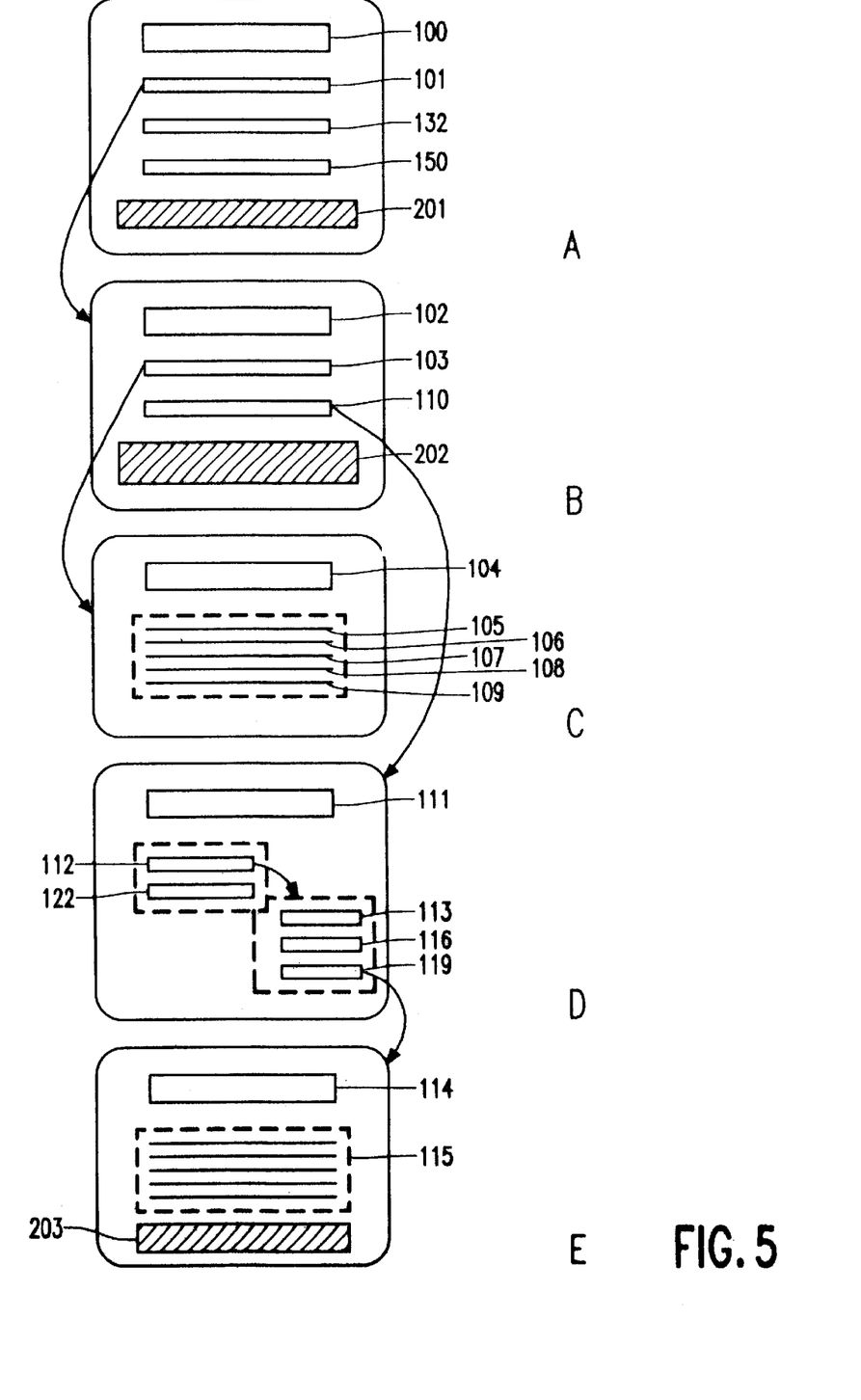
FIG. 5 shows a plurality of menus to illustrate the operations of the transmitter and receiver of FIG. 1.

An example of the transmission of a menu structure will now be given. FIG. 5A shows a main menu (level 0) to be displayed initially. This menu comprises a headline 100 (e.g. the string "MAIN MENU"), a first menu item 101 (e.g. "TV Guide"), a second menu item 132 ("FastFinder") and a third menu item 150 ("User's Guide"). The image further includes a subpicture 201 which provides a brief explanation of the menu item to which the cursor is currently pointing. The example also illustrates that the invention can also be used to distribute straightforward text for the mere purpose of consultation ("User's Guide") or for setting up a personal database ("FastFinder"). The latter refers to a system for keeping a personal database of television programmes recorded on VCR tapes. The relevant data in the section Menu Info for defining the screen of FIG. 5A is:

item_no=100, level=0, item="MAIN MENU", no_of_attributes=0;
item_no=101, level=0, item "TV Guide", no_of_attributes=1,
   attribute={LINKEDITEM,2, . . . };
item_no=132, level=0, item="FastFinder",no_of_attributes=2,
   attribute++={LINKEDITEM,2, . . . },{ATTR_FF};
item_no=150, level=0, item="User Guide",no_of_attributes=1,
   attribute={LINKEDITEM,2, . . . };

Only the items of the relevant menu are mentioned. Note the peculiar way of assigning item numbers. The items are consecutively numbered, starting with the headline (100) and first item (101) of the main menu at level 0, then the headline (102) and first item (103) of the menu at level 1, etc. The second item of the menu at level 0 thus obtains a number (132) following the last item of all the menus connected to the first item. The numbering starts with item_no=0 but, for reasons of clarity, the items are here given the same number as the reference numerals shown in FIG. 5.

To each item of the menu of FIG. 5A, an attribute {LINKEDITEM,2, . . . ,} is attached. As explained before, this attribute invokes the associated subpicture 201 to be displayed when the cursor touches (not: selects) the item. The attribute {FF} in the example defines a special function (FastFinder) to be executed by the receiver when the corresponding item is selected.

FIG. 5B shows a submenu (level 1) to be displayed upon selecting the first menu item 101 of the main menu. The menu comprises a headline 102 ("TV Guide"), a menu item 103 ("Now on TV"), a menu item 110 ("Overview"), and a subpicture 202 showing a commercial for example. The relevant data in the section Menu Info for defining the screen of FIG. 5B is:

item_no=102, level=1, item="TV GUIDE", no_of_attributes=1,
   attribute={GRPHCS, . . . };
item_no=103, level=1, item="Now on TV", no_of_attributes=0;
item_no=110, level=1, item="Overview", no_of_attributes=0;

The attribute {GRPHCS, . . . } attached to the headline refers to subpicture 202 to be displayed. Because this attribute is attached to the headline rather than a menu item, the subpicture remains on screen as long as this menu is displayed, independent of the cursor position.

FIG. 5C shows a submenu at level 2, to be displayed upon selecting menu item 103 in FIG. 5B. It comprises a headline 104 ("NOW ON TV—19:38") and programme items 105–109, each representing a television programme being broadcast now. The relevant data in the section Menu Info is:
item_no=104, level=2, item="NOW ON TV—", no_of_attributes=1
   attribute={INSTIME, . . . };
item_no=105, level=2, item="@. . . ", no_of_attributes=0;
item_no=106, level=2, item="@. . . ", no_of_attributes=0;
item_no=107, level=2, item="@. . . ", no_of_attributes=0;
item_no=108, level=2, item="0̂. . . ", no_of_attributes=0;
item_no=109, level=2, item="0̂. . . ", no_of_attributes=0;
Herein, the attribute {INSTIME, . . . } adds the current time (19:38) to the headline. The first character @ of a menu item indicates a references to a string in a teletext page. This may be a teletext page transmitted by a different television transmitter. The first character 0̂ of a menu item indicates a reference to a string in the Programme Info section.

FIG. 5D shows the screen to appear upon selecting menu 110. Besides the headline 111 ("OVERVIEW"), this screen displays two submenus simultaneously. A first submenu comprising items 112 ("Today") en 122 ("Tomorrow") has the same level (=2) as the menu of FIG. 5C. A second submenu comprising items 113 ("Morning"), 116 ("Afternoon") and 119 ("Evening") is a level 3 menu. The first submenu is active. The second submenu becomes active if one of the items 112 or 122 is selected. The relevant data in the section Menu Info is:
item_no=111, level=2, item="OVERVIEW", no_of_attributes=1,
   attribute={MULTILEVEL, . . .};
item_no=112, level=2, item="Today", no_of_attributes=0;
item_no=113, level=3, item="Morning", no_of_attributes=0;
item_no=116, level=3, item="Afternoon", no_of_attributes=0;
item_no=119, level=3, item="Evening", no_of_attributes=0;
item_no=122, level=2, item="Tomorrow", no_of_attributes=0;
item_no=123, level=3, item="Morning", no_of_attributes=0;
item_no=126, level=3, item="Afternoon", no_of_attributes=0;
item_no=129, level=3, item="Evening", no_of_attributes=0;
The simultaneous display of two menus at different levels is controlled by the attribute MULTILEVEL (see also the description of the section Menu Info).

FIG. 5E shows a level 4 menu to appear upon selecting today's evening programmes (item 119 in FIG. 5D). The image also includes a subpicture 203 with a brief preview of the program which the cursor is currently touching. Like a linked item, it is automatically replaced by another as the cursor moves over the programme items. The relevant data in the section Menu Info is:
item_no=114, level=4, item="EVENING", no_of_attributes=0;
item_no=115, level=4, item="", no_of_attributes=2,
   attribute++={SORT_DATE, 0},{SORT_TIME, . . .};

Besides the headline, this menu comprises one menu item only. The attributes {SORT_TIME, . . .} and {SORT_DATE,0} attached to this menu item expand the item to a list of programme items transmitted in the Programme Info section. The video guide protocol prescribes that additional information prog_info) to a programme title is to be displayed automatically. A special mechanism for enabling or disabling the display of subpicture 203 can thus be dispensed with.

In the example above, the screens comprising television programme information, such as shown in FIGS. 5C and 5E, constitute the leafs of the tree. It can be envisaged, however, to include further screens allowing the user to automatically set the timer of a videorecorder, to access detailed description of a television programme he is interested in, or (in the case of electronic shopping) to automatically dial a predetermined telephone number and order a selected product.

Operation of the Receiver

Figure 6:
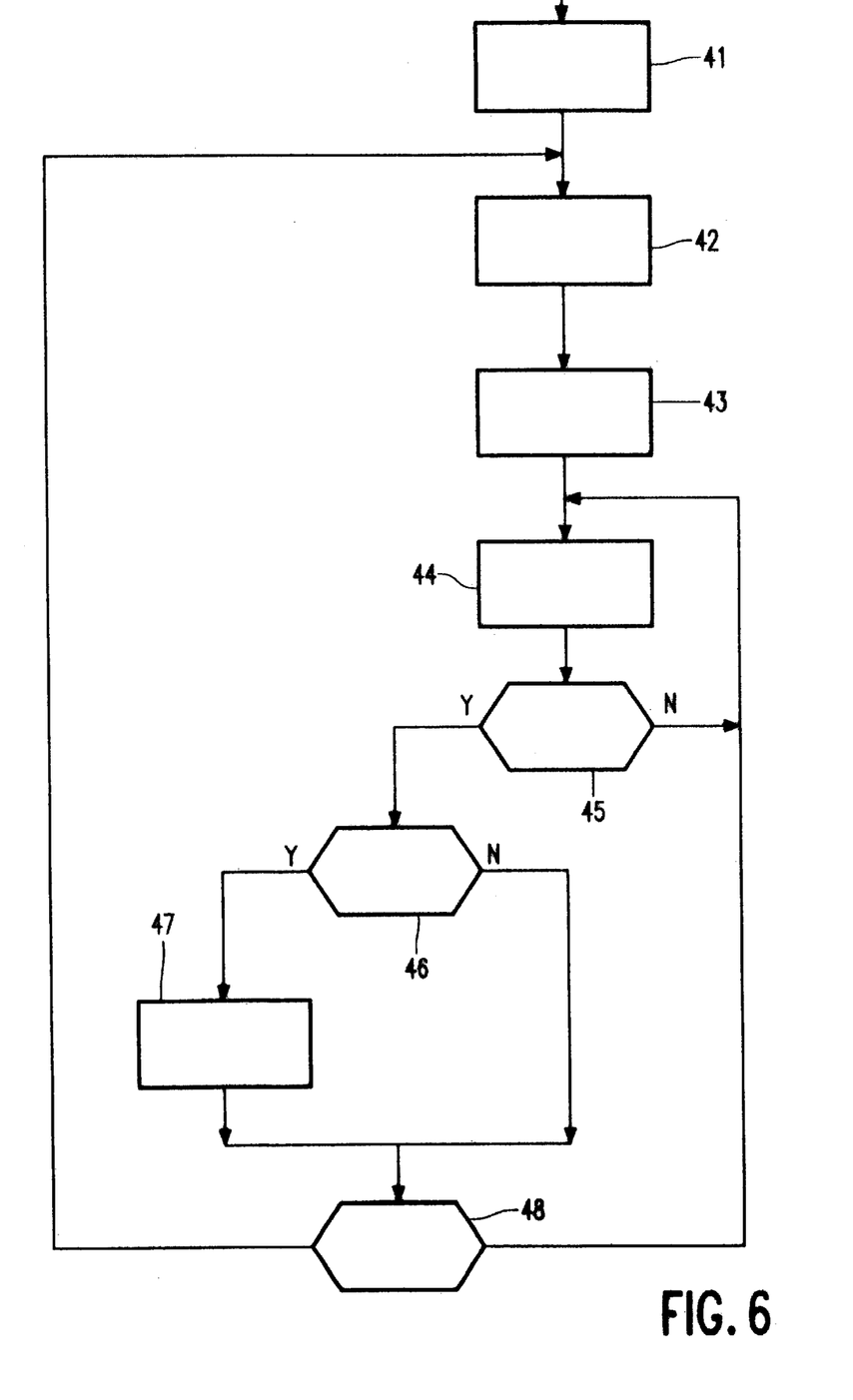
FIG. 6 shows a flow chart of operations carried out by a microprocessor shown in FIG. 1.

The operation is determined by a control program stored in a memory of microprocessor 25 (FIG. 1). FIG. 6 shows a flow chart of operations carried out by the microprocessor. In an initial step 41, the processor determines the sequence of teletext pages constituting the database. As already mentioned above, a predetermined page comprises the list of pages to be acquired. In the step 41, the processor further applies the relevant page numbers to the data decoder 23 (FIG. 1). As each page arrives, the data accommodated therein are stored in memory 24 (FIG. 1). The processor sorts the received data so as to store each section of the database in a corresponding segment of said memory. More in particular, the processor sorts all menu items if the Menu Info section in order of increasing item_no. During this process, the user may use the television receiver for other purposes, e.g. watching a television programma. The process may also be carried out in a standby state of the receiver, e.g. during the night.

A step 42 is executed when the user desires to consult the television program guide. In this step, the processor searches, in the memory segment holding the Menu Info section, all items relevant to the menu to be displayed. For the initial main menu, this step is equivalent to searching all items having level=0. For menus to be displayed after selection of an item having item_no=n, the step 42 comprises the substeps of: searching the item having item_no= n+1; reading the level L associated therewith; and searching all subsequent items having level L until an item having a level lower than L is found. For example, if item 101 at level 0 (FIG. 5A) is selected, the processor searches all subsequent items at level 1 (i.e. 102, 103 and 110) until an item at level 0 is found again (i.e. item 132).

In a step 43, the menu is composed and displayed using the display parameters such as text font, height, spacing, colour, etc. as defined in the Layout Info section stored in a predetermined segment of memory 24 (FIG. 1). The processor determines for each menu_item whether it starts with a 0̂ or @ character. If case of a 0̂ character, the text string to be displayed is to be read from the Programme Info section. In case of a @ character, the text string to be displayed is to be read from a teletext page. This may be a teletext page transmitted by a different TV station. The processor also checks whether an attribute {GRPHCS} is associated with the headline. If that is the case, the relevant subpicture is read from the graphics segment of memory 24 (FIG. 1) and written in the display segment of the memory (c.f. FIG. 5B). The processor further checks the presence of an attribute {MULTILEVEL} so as to decide whether two menus have to be displayed simultaneously on screen (c.f. FIG. 5D).

In a step 44, the processor controls the position of a cursor displayed on screen in response to cursor positioning signals from remote cursor control device 27 (FIG. 1). In a step 45, the processor determines whether or not the cursor position touches a menu item displayed on screen. If that is not the case, the processor returns to step 44. If the cursor touches a menu item, the processor checks in a step 46 whether an attribute {LINKEDITEM} is associated with said menu item. If such an attribute is present, a step 47 is carried out in which the subpicture referred to is read from the graphics segment of memory 24 (FIG. 1), and displayed (c.f. FIG.5A). If the cursor touches a programme item rather than a menu item, the processor displays prog_info associated therewith (c.f. FIG. 5E).

In a step 48, the pressing of an OK button on the remote cursor device is detected. As long as OK is not pressed, the loop of steps 44–48 is cycled through so as to keep track of the cursor position and, if applicable, to automatically change the subpicture. If OK is pressed, the processor returns to step 42 so as to collect the menu items constituting a new menu to be displayed.

It is noted that the electronic database and associated linking data is not necessarily to be accommodated in the vertical flyback period of a broadcast television signal. The data can also be transmitted via a telephone network or computer network (e.g. Internet), or distributed on storage media such as CDROM or computer diskettes. Accordingly, the receiver may take the form of a data processing and display unit (e.g. a personal computer), provided with an appropriate interface circuit ("extension card") for receiving the data signals.

In summary, a method and arrangements for transmitting and receiving menus, e.g. for accessing an electronic television programme guide, are disclosed. Each menu comprises a plurality of menu items which can be selected by a user. With each menu item, a subpicture can be associated. Said subpicture is displayed when the cursor touches said menu item on the screen. Thus, by moving the cursor over the screen, the subpicture dynamically changes so as to display a brief explanation of the menu items.

What is claimed is:

1. A method of transmitting a menu to a receiver for display on a display screen, said method including the step of transmission of menu structure data defining displayable menu items which are user selectable by a cursor, on said screen;

wherein said method further comprises the steps of:
   transmitting subpictures data defining displayable subpictures;
   associating each menu item with attribute data linking said menu item with a particular subpicture wherein if a plurality of menu items link to the same subpicture, the subpicture is transmitted only once; and
   selecting a menu item by touching said menu item with said cursor such that the menu item is located at a display position corresponding to the position of said cursor, and simultaneously displaying, by virtue of said touching of said menu item with said cursor, the selected menu item with a subpicture determined by the attribute data which is linked to said menu item.

2. The method as claimed in claim 1, wherein said attribute data comprises an index number associated with said subpicture.

3. A transmitter for transmitting a menu to a receiver for display on a display screen, said transmitter comprising means for transmitting menu structure data defining displayable menu items which are user selectable by a cursor on said screen;

wherein said transmitter further comprises:

means for transmitting subpicture data defining displayable subpictures;

means for determining when a menu item has a display position corresponding to the position of the cursor on the display screen; and means for associating each menu item with attribute data linking said menu item with a particular subpicture, and for simultaneously displaying a menu item located at a display position corresponding to the position of said cursor with a subpicture which is linked thereto by the attribute automatically upon the determining means making a determination that the menu item has a display position corresponding to the position of the cursor on the display screen such that if a plurality of menu items link to the same subpicture, the subpicture is transmitted only once.

4. A display signal generator comprising:

a first memory means for storing menu structure data defining displayable menu items which are user-selectable by operation of a cursor on a display screen;

second memory means for storing subpicture data defining displayable subpictures;

means for determining when a menu item has a display position corresponding to the position of the cursor on the display screen;

means for associating each menu item with attribute data linking said menu item with a particular subpicture wherein if a plurality of menu items link to the same subpicture, the subpicture is transmitted only once; and means for simultaneously displaying a menu item which is located at a display position which corresponds to the position of said cursor with a subpicture which is linked to said menu item by attribute data automatically upon the determining means making a determination that the menu item has a display position corresponding to the position of the cursor on the display screen.

5. A television receiver comprising a display signal generator as claimed in claim 4, further comprising means for receiving said menu structure data and said subpicture data from a transmitter, and storing said menu structure data in said first memory means and said subpicture data in said second memory means.

6. A video recorder comprising a display signal generator as claimed in claim 4, further comprising means for receiving said menu structure data and said subpicture data from a transmitter, and storing said menu structure data in said first memory means and said subpicture data in said second memory means.

* * * * *